United States Patent [19]

Keir

[11] Patent Number: 4,955,461
[45] Date of Patent: Sep. 11, 1990

[54] VALVE SYSTEM FOR PREVENTING UNCONTROLLED DESCENT IN FORK LIFT TRUCKS

[75] Inventor: John B. Keir, Rochester Hills, Mich.
[73] Assignee: Vickers, Incorporated, Troy, Mich.
[21] Appl. No.: 265,235
[22] Filed: Oct. 31, 1988
[51] Int. Cl.[5] .............................................. B66B 9/20
[52] U.S. Cl. ..................................... 187/9 R; 91/443; 91/447; 414/674
[58] Field of Search ................. 91/447, 446, 445, 443; 414/275, 674; 187/9 R, 9 E

[56] References Cited

U.S. PATENT DOCUMENTS

| | | | |
|---|---|---|---|
| 1,628,390 | 5/1927 | Cochran | 414/674 X |
| 2,874,681 | 2/1959 | Vander Kaay | 91/446 |
| 3,151,455 | 10/1964 | Tennis | 91/446 |
| 3,241,462 | 3/1966 | Karazija | 91/443 |
| 3,382,771 | 5/1968 | Nutter | 91/517 |
| 3,438,308 | 9/1966 | Nutter | 91/447 |
| 3,630,216 | 12/1971 | Kelly | 137/456 X |
| 3,871,266 | 3/1975 | Schwab et al. | 91/517 |
| 3,960,286 | 6/1976 | Spooner et al. | 414/674 X |
| 3,990,583 | 11/1976 | Nishida et al. | 91/420 |
| 4,088,151 | 5/1978 | Schurger | 91/447 |
| 4,392,771 | 7/1983 | Smalley | 414/674 X |
| 4,593,791 | 6/1986 | Matthews | 187/9 E |
| 4,762,203 | 8/1988 | Ryan | 187/9 E |
| 4,892,028 | 1/1990 | Stivers | 91/420 X |

Primary Examiner—Edward K. Look
Assistant Examiner—John E. Ryznic
Attorney, Agent, or Firm—Barnes, Kisselle, Raisch, Choate, Whittemore & Hulbert

[57] ABSTRACT

A hydraulic lift valve system for fork lift trucks comprising a three way valve including a spool in a bore having a first neutral position, a second lift position and a third lower position. In the second lift position, the spool functions to apply fluid from a source to a cylinder for lifting the fork of the truck only after the pressure exceeds the load pressure and a predetermined value as established by a first poppet valve. Upon shifting to the third position the spool functions to permit exhaust of the fluid in the cylinder and therefore lowering the fork only after a predetermined pressure is established in a pilot valve which permits the first poppet valve to open, thereby insuring that the fork of the lift truck is not lowered unless there is a predetermined load on the fork. By this arrangement, the problem of uncontrolled descent of the fork upon engagement of the fork with an object is obviated.

6 Claims, 3 Drawing Sheets

VALVE SYSTEM FOR PREVENTING UNCONTROLLED DESCENT IN FORK LIFT TRUCKS

This invention relates to hydraulic systems for fork lift trucks and particularly a hydraulic lift system.

BACKGROUND AND SUMMARY OF THE INVENTION

In fork lift trucks, it is common to utilize one or more cylinders to lift the fork of the truck. In such trucks, hydraulic systems usually comprise a directional valve that in one position is in neutral, in a second position provides fluid to the cylinder to lift the forks and a third position permits the fluid to exhaust from the cylinder to lower the forks.

In such a system, it is possible that, upon lowering, the forks engage inadvertently another load or an edge of a storage rack in which case the flexible chain extending from the body of the fork lift truck to the fork is permitted to slacken and result in an uncontrolled descent of the forks.

It is heretofore been suggested that parallel lines be provided between a three position control valve with a check valve in one line and reverse pressure relief valve in the other so that lowering will occur only when there is a predetermined pressure. However, such an arrangement has a disadvantage of increasing the pressure drop to and from the cylinder.

Accordingly among the objectives of the present invention are to provide a hydraulic lift system for fork lift trucks which obviates the problem of uncontrolled descent of the fork upon engagement of the fork with an object; which accurately is set at a pressure such that it is between that required to support the total fork assembly with no load on the fork and the pressure generated by the lift cylinder rod assembly; which does not have an undesirable pressure drop; and which does not have increase leak paths which would increase cylinder fork leakage.

In accordance with the invention a hydraulic lift valve system for fork lift trucks comprises a three way valve including a spool in a bore having a first neutral position, a second lift position and a third lower position. In the second lift position, the spool functions to apply flow of oil from a source to a cylinder for lifting the fork of the truck only after the pressure exceeds load pressure plus a predetermined value as established by a poppet valve. Upon shifting to the third position the spool functions to permit exhaust of the fluid in the cylinder and therefore lowering the fork only after a predetermined pressure is established in a pilot valve which permits the poppet valve to open, thereby insuring that the fork of the lift truck is not lowered unless there is a predetermined load on the fork. By this arrangement, the problem of uncontrolled descent of the fork upon engagement of the fork with an object is obviated.

DESCRIPTION

Figure 1:
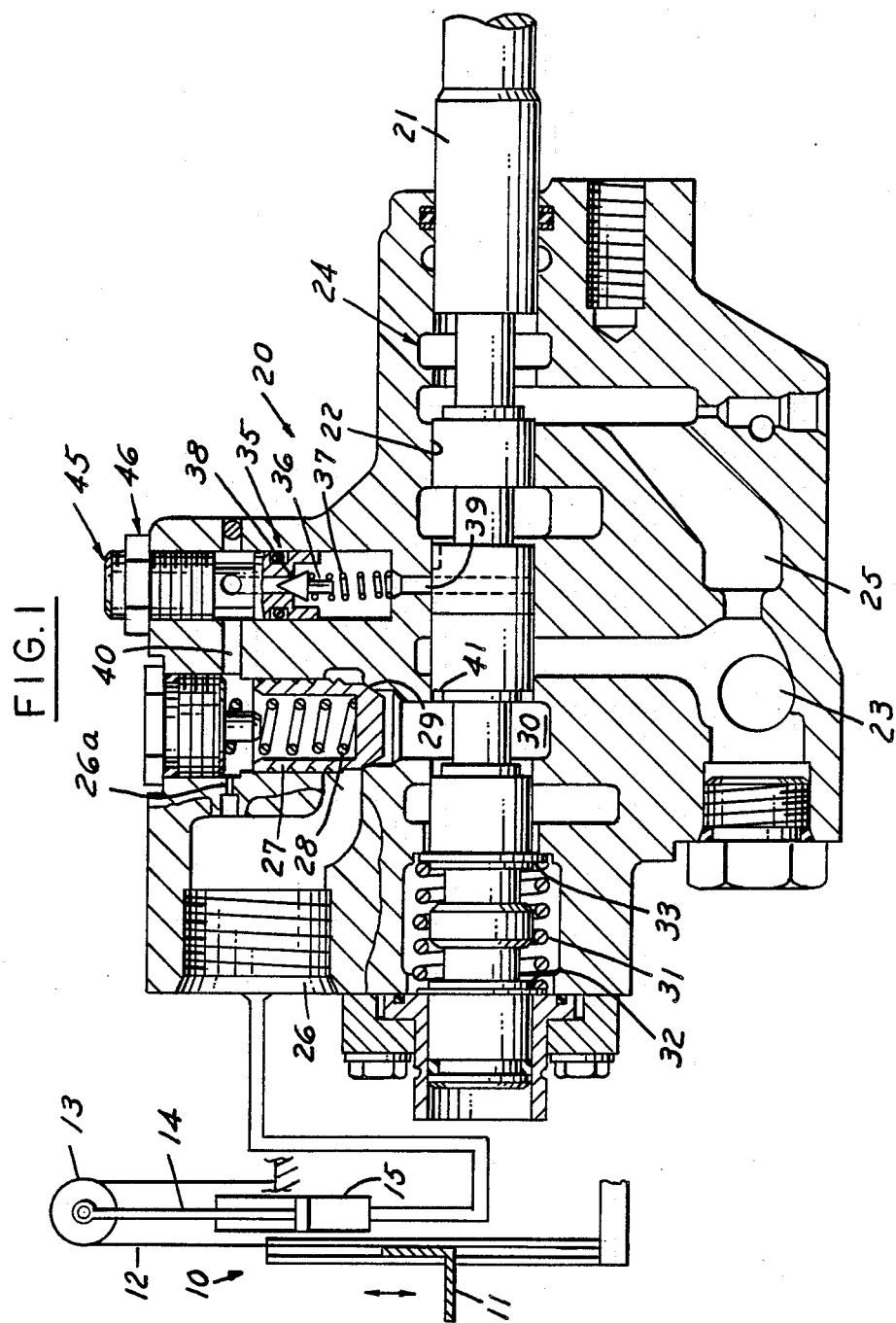
FIG. 1 is a partly schematic sectional view of valve embodying the invention.

Referring to FIG. 1, the hydraulic valve system is shown as applied to a hydraulic fork lift truck including a body 10 that supports a fork 11 for sliding movement. It is common to move the fork lift by attaching the forks to the body of the fork lift truck and utilizing a flexible connector such as a chain 12 that is trained over a sprocket 13 on the end of a piston rod 14 which operates in a cylinder 15. Upon applying fluid to the cylinder 15 the rod 14 is elevated to raise the fork 11. Upon exhaust of the cylinder 15, the fork 11 is lowered by the weight of the fork lift assembly when there is no load or by the load and the weight of the fork lift assembly if there is a load. If upon lowering the fork 11, the fork 11 encounters an obstacle such as the edge of a storage rack, the downward movement of the fork will be momentarily interrupted causing a slack in the chain 12 and continued exhaust of the fluid from the cylinder 15. Movement of the truck away from the obstacle will result in uncontrolled movement of the forks which can possibly cause shifting or loss of the load from the forks.

In accordance with the invention, the hydraulic valve system includes a three way directional valve 20 that may comprise one of a plurality of valves in a bank. The valve 20 is a three-way valve and includes a spool 21 that is operable in a bore 22 and has a first or neutral position as shown in FIGS. 1 and 2, a second or lift or out position as shown in FIG. 3 and a third or lower or in position as shown in FIG. 4.

The valve body 20 includes an inlet 23 to a source of fluid such as a pump. An outlet 24 to exhaust or tank, the inlet and outlet being connected to one another through a passage 25. The body further includes an outlet 26 that is connected to the cylinder 15. A poppet valve 27 is yieldingly urged radially inwardly by a spring 28 against a seat 29 to normally prevent flow between passage 26 and an annulus 30. The spool 21 is yieldingly urged by a spring 31 to the neutral position, the spring being interposed between washers 32, 33 that are fixed to longitudinally spaced portions of the spool 21. A pilot pressure valve 35 is provided in a radial passage and includes a spring loaded valve 36 yieldingly urged by the spring 37 against a seat 38 to normally prevent flow from passage 40 extending to the other side of the poppet valve 27 to radial passage 39. An orifice 26a limits the flow into the chamber and allows the pressure relief valve 35 to be of low flow capacity.

Figure 2:
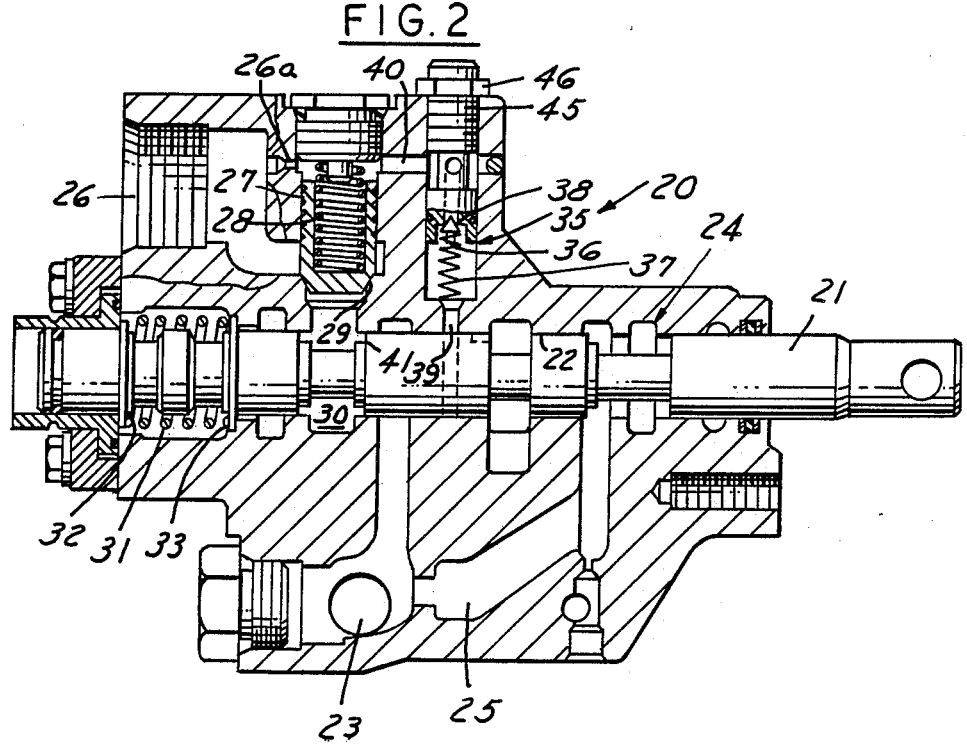
FIGS. 2, 3, and 4 are schematic views showing the hydraulic system in different operative positions.

When the spool 21 is in the first or neutral position as shown in FIGS. 1 and 2, the fluid from the source is bypassed through the bypass passage 25 to the tank outlet 24.

Figure 3:
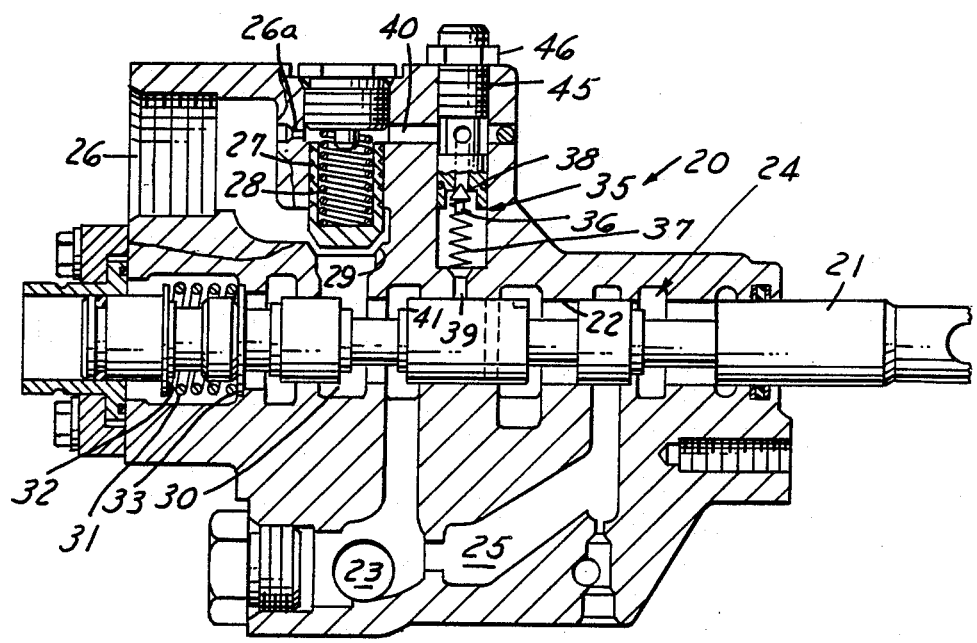
Figure 4:
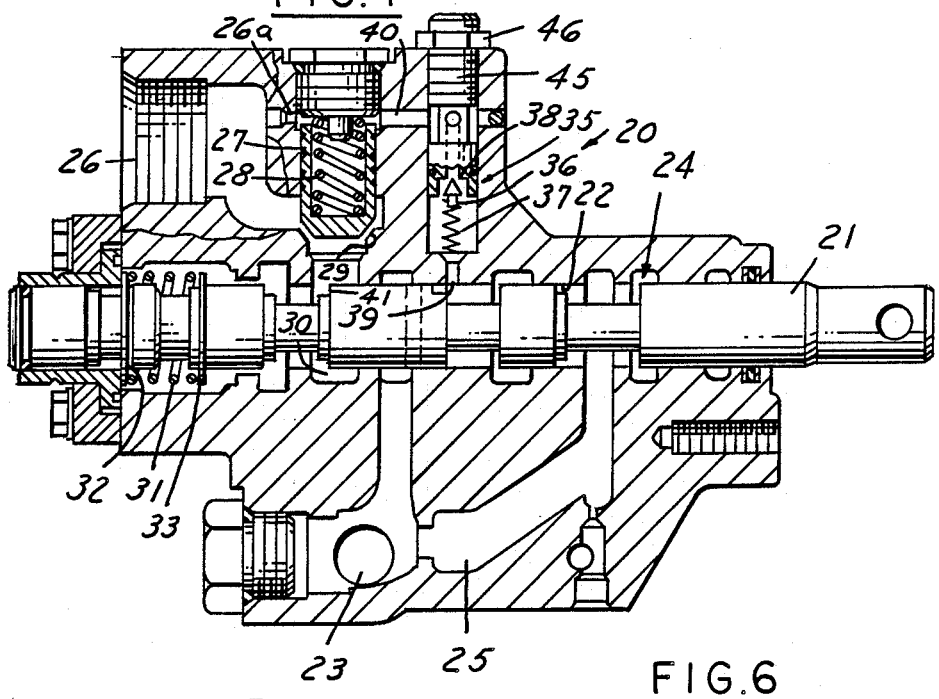

When the spool is shifted to the first lift or out position as shown in FIG. 3, the bypass is closed and fluid from the source is applied to the seat of the poppet valve 27 past the undercut 41 on the spool 21. As the pressure rises and reaches a predetermined point, the pressure forces the poppet 27 to lift off its seat and permits hydraulic fluid to flow to the cylinder port. When the spool 21 is permitted to return to its neutral position, the poppet valve 27 is seated by the spring 28 and the hydraulic forces to hold the fork of the fork lift truck in a predetermined position.

When the spool 21 is shifted to the second or lower in position as shown in FIG. 4, the bypass is unrestricted and no pressure is developed. However, the poppet valve 27 will remain closed and the cylinder will not lower until a predetermined pressure is established by the pilot valve 35 and fluid is provided to the back side of the poppet valve 27 permitting the poppet valve 27 to open. This pressure is set to be between the pressure generated by the weight of the total fork assembly of the fork and chain with no load on the fork and the pressure generated by the weight of the lift cylinder rod assembly comprising the rod piston and sprocket. This prevents lowering of the rod if the fork engages inadvertently or hangs up on objects such as a storage rack, and thereby obviates the uncontrolled descent of the fork which might occur.

The poppet valve 27 also performs the additional function of a load drop check valve, thereby obviating any momentary gravity load drop as might occur when valve 20 is operated to lift an already lifted load higher.

Figure 5:
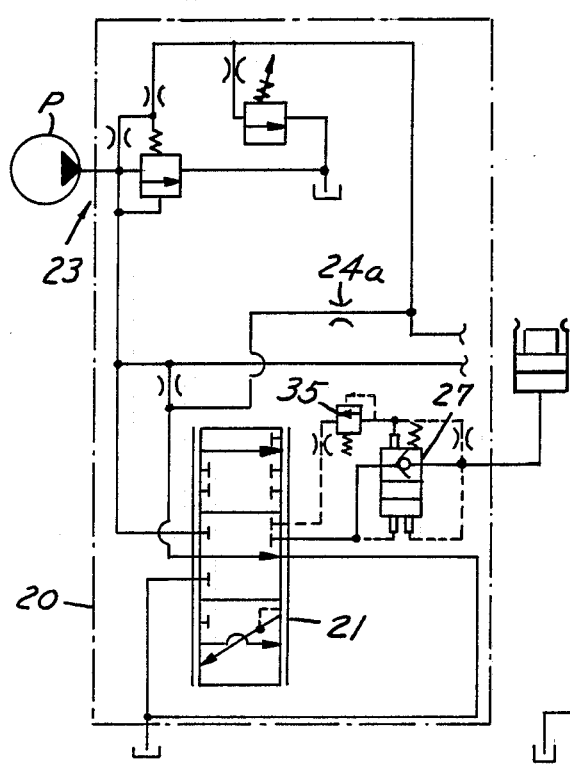
FIG. 5 is a schematic of the hydraulic valve system embodying the invention.
Figure 6:
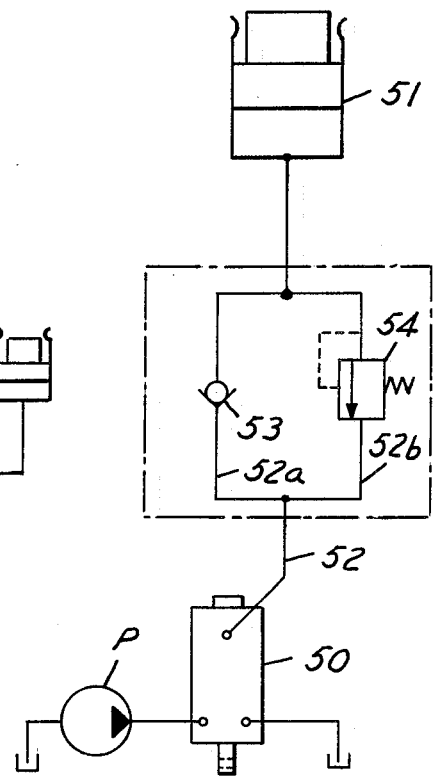
FIG. 6 is a schematic of a prior art hydraulic valve system.

FIG. 5 is a schematic of the hydraulic circuit embodying the invention showing the pump P for providing fluid through inlet 23 to the valve 20 and including the poppet valve 27 wherein the pilot operated valve 35 functions upon movement of the spool 21 to a third or lowering position to permit the poppet valve 27 to open only after a predetermined pressure is established in the pilot valve 35. This may be contrasted to the prior art arrangement which shows a directional valve 50 that controls the flow of fluid to and from the lift cylinder 51 through a line 52. The line 52 has parallel portions 52a, 52b with a check valve 53 in line 52a and a reverse pressure relief valve 54 in line 52b so that lowering will only occur when there is a predetermined pressure. As indicated previously, such an arrangement has the disadvantage of causing an increased pressure drop. In the present invention wherein the setting of the poppet valve can be readily adjusted by threading the stop 45 inwardly and outwardly as shown in FIG. 1 and thereby increasing the spring force on the poppet. The stop is locked in position by a nut 46.

It can thus be seen that there has been provided a hydraulic lift system for fork lift trucks which obviates the problem of uncontrolled decent of the fork upon engagement of the fork with an object; which accurately determines the pressure such that it is between that required to support the total fork assembly with no load on the fork and the pressure generated by the lift cylinder rod assembly; which does not have an undesirable pressure drops; and which does not increase leak paths which would increase cylinder fork leakage.

What is claimed is:

1. A hydraulic lift valve system for fork lift trucks comprising a fork movably mounted for vertical movement on a fork lift truck, an actuator on said truck having a movable member, a flexible connector connecting said fork and said movable member of said actuator, a three-way valve including a bore, a spool in said bore having a first neutral position, a second lift position and a third lower position, a poppet valve hydraulically connected to said cylinder for controlling flow to and from said actuator, a pilot pressure valve hydraulically connected to said poppet valve, said spool functioning in said second position to apply flow from a source to said actuator for lifting the fork of the truck only after the pressure exceeds a first predetermined value, said spool functioning in said third position to permit exhaust of the fluid in the actuator cylinder and therefore lowering the fork only after a second predetermined pressure is established by said pilot pressure valve to cause said poppet valve to open, thereby insuring that the fork of the lift truck is not lowered unless there is a predetermined load on the fork thereby preventing uncontrolled descent of the fork when the fork inadvertently engages an obstacle which prevents descent.

2. The hydraulic lift valve system set forth in claim 1 wherein said poppet valve includes means for varying the pressure at which set poppet valve will function.

3. The hydraulic lift valve system set forth in claim 1 wherein said poppet valve includes a valve member controlling the flow to and from the cylinder of the fork lift truck, said pilot pressure valve applying a predetermined pressure opposing opening of said poppet valve until after said pressure applied to said valve by said fluid from said cylinder exceeds said predetermined value.

4. The hydraulic lift valve set forth in claim 1 wherein said system comprises of a valve body, said three-way valve, said poppet valve and said pilot pressure valve being mounted in said body.

5. The hydraulic lift system set forth in claim 1 wherein said second predetermined pressure is set between the pressure generated by the total fork assembly of fork and associated actuator with no bond on the truck and the pressure generated by the total fork assembly less the weight of the fork.

6. The hydraulic lift system set forth in claim 5 wherein said actuator comprises a cylinder having a piston rod, a sprocket rotatably mounted on said piston rod, said flexible connector comprising a chain trained over said sprocket.

* * * * *